(12) United States Patent
Gan

(10) Patent No.: US 9,367,156 B2
(45) Date of Patent: Jun. 14, 2016

(54) TOUCH-CONTROL METHOD, DEVICE, AND ELECTRONIC DEVICE

(75) Inventor: Dayong Gan, Beijing (CN)

(73) Assignees: LENOVO (BEIJING) CO., LTD., Haidian District, Beijing (CN); BEIJING LENOVO SOFTWARE LTD., Haidian District, Beijing (CN)

( * ) Notice: Subject to any disclaimer, the term of this patent is extended or adjusted under 35 U.S.C. 154(b) by 163 days.

(21) Appl. No.: 14/122,059

(22) PCT Filed: May 23, 2012

(86) PCT No.: PCT/CN2012/075960
§ 371 (c)(1),
(2), (4) Date: Nov. 25, 2013

(87) PCT Pub. No.: WO2012/159568
PCT Pub. Date: Nov. 29, 2012

(65) Prior Publication Data
US 2014/0092049 A1 Apr. 3, 2014

(30) Foreign Application Priority Data
May 24, 2011 (CN) .......................... 2011 1 0135816

(51) Int. Cl.
*G06F 3/041* (2006.01)
*G06F 3/0488* (2013.01)
*G06F 3/0484* (2013.01)

(52) U.S. Cl.
CPC .............. *G06F 3/041* (2013.01); *G06F 3/0414* (2013.01); *G06F 3/0484* (2013.01); *G06F 3/04883* (2013.01); *G06F 3/04886* (2013.01)

(58) Field of Classification Search
CPC ..... G06F 3/044; G06F 3/0488; G06F 3/0414; G06F 3/0418; G06F 3/0481; G06F 3/04883; G06F 3/04886; G06F 3/041; G06F 3/0484; G06F 3/0412
USPC .................................................. 345/173–175
See application file for complete search history.

(56) References Cited

U.S. PATENT DOCUMENTS

| 7,663,609 B2 | 2/2010 | Miyata et al. |
| 2006/0170660 A1 | 8/2006 | Miyata et al. |
| 2008/0267465 A1 | 10/2008 | Matsuo et al. |

FOREIGN PATENT DOCUMENTS

| CN | 1815428 | 8/2006 |
| CN | 1942849 | 4/2007 |

OTHER PUBLICATIONS

PCT/CN2012/075960 International Search Report dated Aug. 30, 2012 (4 pages including English translation).
Chinese First Office Action with English Translation for related Application No. 201110135816.1 dated Sep. 29, 2014, 27 pages.
PCT/CN2012/075960 International Preliminary Report on Patentability (9 pages including English translation).

*Primary Examiner* — Aneeta Yodichkas
*Assistant Examiner* — Saifeldin Elnafia
(74) *Attorney, Agent, or Firm* — Brinks Gilson & Lione; G. Peter Nichols

(57) ABSTRACT

The purpose of the invention is to provide a touch-control method, apparatus and an electronic device. The touch-control method is applied to an electronic device which has a touch surface and a sensor. The touch-control method includes determining a first contact-area and a second contact-area based on the data acquired by the sensor, the first contact-area and the second contact-area being the area of the contact regions of the touch surface in contact with a pointing object at different time moments; based on the first contact-area and the second contact-area, determining a first instruction-determination-parameter associated with an area-variation amount; based on a pre-stored first correspondence-relationship between an instruction-determination-parameter interval and an instruction-sequence, determining and executing a first instruction-sequence which corresponds to the instruction-determination-parameter interval where the first instruction-determination-parameter locates.

15 Claims, 1 Drawing Sheet

TOUCH-CONTROL METHOD, DEVICE, AND ELECTRONIC DEVICE

This application claims priority to International Application No. PCT/CN2012/075960 filed May 23, 2013 and to Chinese Patent Appln. 201110135816.1 filed May 24, 2011, the entire contents of each are incorporated herein by reference.

BACKGROUND

The present disclosure relates to the field of electronics, in particular, relates to a touch-control method, apparatus and an electronic device.

For operational convenience, currently, a lot of electronic devices utilize a touch-control apparatus to replace a traditional input apparatus like a mouse or a keyboard. When in use, only an operation performed by a finger or other object on a touch surface is needed, then the information to be input can be determined and selected by the system based on the touch-position.

Distinguishing from technical principles, the types of the technologies employed in a touch-control device include: pressure-sensing technology, electrical resistance technology, electrical capacitance technology, infrared-ray technology, and surface acoustic wave technology, etc.; each type of touch-control device has its own advantages and shortcomings.

In a pressure-sensing-technology-based touch-control device, with the principle that a contact-area changes with pressure of a finger, a touch-sensor can be used to identify a contact-area, and thus judge the pressure on the touch-sensor applied by the user; in the meanwhile, an area-interval is set, each area-interval corresponding to an instruction-sequence; when it is determined based on the detected data that the contact-area locates in an interval, then it is identified as a corresponding pressure, so that a corresponding instruction is triggered and executed.

However, during the implementation of the embodiments of the present disclosure, the inventors found that, the prior art has at least a shortcoming of inflexible trigger-control, which is explained as follows:

In the existing touch-area-based touch-control technology, an absolute value of a touch-area is used to trigger an instruction, and with the consideration of different operators of an electronic device: for instance, a user of a mobile phone may be a children and also may be an adult, and seen from an average level, a child's finger is much smaller than an adult's finger; therefore, for a contact-area (such as an area of 10 units), it may be easy for an adult but hard for a child to implement, because a child's finger is smaller so that a threshold of the contact-area could not be reached even though he presses firmly, which thus leads to failed triggering.

Generally, the area of a thumb finger is greater than the area of other fingers; therefore, if a user is accustomed to using other fingers to operate, then a design, which is successful to trigger when a thumb finger is used, may be failed to trigger when a little finger is used for pressing.

SUMMARY

The object of the embodiments of the present disclosure is to provide a touch-control method, apparatus and an electronic device, for improving the success rate of a touch-control operation.

To achieve the above object, the embodiment of the present disclosure provides a touch-control method, applied to an electronic device which has a touch surface and a sensor, wherein, the touch-control method comprises: based on the data acquired by the sensor, determining a first contact-area and a second contact-area, the first contact-area and the second contact-area being the area of the contact regions of the touch surface in contact with a pointing object at different time moments; based on the first contact-area and the second contact-area, determining a first instruction-determination-parameter associated with an area-variation amount; based on a pre-stored first correspondence-relationship between an instruction-determination-parameter interval and an instruction-sequence, determining and executing a first instruction-sequence which corresponds to the instruction-determination-parameter interval where the first instruction-determination-parameter locates.

In addition, according to an embodiment of this aspect, the first instruction-determination-parameter is the area-variation amount, and the instruction-determination-parameter interval is an area-variation interval.

In addition, according to an embodiment of this aspect, the first contact-area and the second contact-area are the area at a first time moment and a second time moment when the contact regions of the touch surface is in contact with a pointing object, respectively; the first instruction-determination-parameter is a first contact-area variation-rate determined based on the area-variation amount and the time-variation amount, and the instruction-determination-parameter interval is an area variation-rate interval.

In addition, according to an embodiment of this aspect, the first time moment is such a time moment that a predefined period of time has elapsed after it is detected that a pointing object is in contact with the touch surface.

In addition, according to an embodiment of this aspect, the electronic device has a plurality of correspondence-relationships pre-stored therein, each correspondence-relationship corresponding to a different area-interval; the first correspondence-relationship is, among the plurality of correspondence-relationships, the correspondence-relationship corresponding to the area-interval where the first contact-area locates; among the plurality of correspondence-relationships, there exists at least one instruction-sequence, corresponding to a different contact-area variation-rate.

In addition, according to an embodiment of this aspect, before determining and executing the first instruction corresponding to the contact-area variation-rate interval where the first contact-area variation-rate locates, the touch-control method further comprises: after determining based on the data acquired by the sensor that a pointing object is in contact with the touch surface, executing the second instruction.

In addition, according to an embodiment of this aspect, after determining based on the data acquired by the sensor that a pointing object is in contact with the touch surface, said step of executing the second instruction specifically comprises: determining a current contact-area based on the data acquired by the sensor, when it is determined based on the data acquired by the sensor that a pointing object is in contact with the touch surface; judging whether the current contact-area is greater than a predefined threshold; executing the second instruction, when the current contact-area is greater than the predefined threshold.

In addition, the embodiments of the present disclosure provide a touch-control apparatus, applied to an electronic device which has a touch surface and a sensor, wherein, the touch-control apparatus comprises: an area-determination module, used for: based on the data acquired by the sensor, determining a first contact-area and a second contact-area, the first contact-area and the second contact-area being the area of the contact regions of the touch surface in contact with a pointing object at different time moments; an instruction-parameter-determination module, used for: based on the first contact-area and the second contact-area, determining a first instruction-determination-parameter associated with an area-variation amount; a first processing module, used for: based on a pre-stored first correspondence-relationship between an instruction-determination-parameter interval and an instruction-sequence, determining and executing a first instruction-sequence which corresponds to the instruction-determination-parameter interval where the first instruction-determination-parameter locates.

In addition, according to an embodiment of this aspect, the first instruction-determination-parameter is the area-variation amount, and the instruction-determination-parameter interval is an area-variation interval.

In addition, according to an embodiment of this aspect, the first contact-area and the second contact-area are the area of the contact regions at a first time moment and a second time moment when the touch surface is in contact with a pointing object, respectively; the first instruction-determination-parameter is a first contact-area variation-rate determined based on the area-variation amount and the time-variation amount, and the instruction-determination-parameter interval is an area variation-rate interval.

In addition, according to an embodiment of this aspect, the first time moment is such a time moment that a predefined period of time has elapsed after it is detected that a pointing object is in contact with the touch surface.

In addition, according to an embodiment of this aspect, the electronic device has a plurality of correspondence-relationships pre-stored therein, each correspondence-relationship corresponding to a different area-interval; the first correspondence-relationship is, among the plurality of correspondence-relationships, the correspondence-relationship corresponding to the area-interval where the first contact-area locates; among the plurality of correspondence-relationships, there exists at least one instruction-sequence, corresponding to a different contact-area variation-rate.

In addition, according to an embodiment of this aspect, the touch-control apparatus further comprises: a second processing module, used for: before the first processing module performs determining and executing the first instruction corresponding to the contact-area variation-rate interval where the first contact-area variation-rate locates, executing the second instruction after determining based on the data acquired by the sensor that a pointing object is in contact with the touch surface.

In addition, according to an embodiment of this aspect, the second processing module specifically comprises: a unit for determining the current contact-area based on the data acquired by the sensor, when it is determined based on the data acquired by the sensor that a pointing object is in contact with the touch surface; a unit for judging whether the current contact-area is greater than a predefined threshold; a unit for executing the second instruction when the current contact-area is greater than the predefined threshold.

In addition, the embodiments of the present disclosure provide an electronic device having a touch surface, wherein, the electronic device further comprises: a sensor; a storage module, for storing a first correspondence-relationship between an instruction-determination-parameter interval and an instruction-sequence; a processor, which is connected with the sensor and the storage module, and is used for: based on the data acquired by the sensor, determining a first contact-area and a second contact-area, and based on the first contact-area and the second contact-area, determining a first instruction-determination-parameter associated with an area-variation amount, and based on a first correspondence-relationship stored in the storage module, determining and executing a first instruction-sequence which corresponds to the instruction-determination-parameter interval where the first instruction-determination-parameter locates, the first contact-area and the second contact-area being the area of the contact regions of the touch surface in contact with a pointing object at different time moments.

In addition, according to an embodiment of this aspect, the processor specifically comprises: an area-determination module, which is connected with the sensor, and is used for: based on the data acquired by the sensor, determining a first contact-area and a second contact-area, the first contact-area and the second contact-area being the area of the contact regions of the touch surface in contact with a pointing object at different time moments; an instruction-parameter-determination module, which is connected with the area-determination module, and is used for: based on the first contact-area and the second contact-area, determining a first instruction-determination-parameter associated with an area-variation amount; a first processing module, which is connected with the instruction-parameter-determination module and the storage module, and is used for: based on a pre-stored first correspondence-relationship between an instruction-determination-parameter interval and an instruction-sequence, determining and executing a first instruction-sequence which corresponds to the instruction-determination-parameter interval where the first instruction-determination-parameter locates.

In addition, according to an embodiment of this aspect, the first instruction-determination-parameter is the area-variation amount, and the instruction-determination-parameter interval is an area-variation interval.

In addition, according to an embodiment of this aspect, the first contact-area and the second contact-area are the area of the contact regions at a first time moment and a second time moment when the touch surface is in contact with a pointing object, respectively; the first instruction-determination-parameter is a first contact-area variation-rate determined based on the area-variation amount and the time-variation amount, and the instruction-determination-parameter interval is an area variation-rate interval.

In addition, according to an embodiment of this aspect, the first time moment is such a time moment that a predefined period of time has elapsed after it is detected that a pointing object is in contact with the touch surface.

The embodiments of the present disclosure have the following beneficial effects:

In a specific embodiment of the present disclosure, a parameter associated with an area-variation amount is used to trigger a touch-control, and by using the parameter associated with an area-variation amount, the problem of failed triggering caused by different sizes of a pointing object can be avoided, thereby improving the success rate of triggering.

In a specific embodiment of the present disclosure, an area variation-rate is used to trigger a touch-control, and by using a parameter associated with an area-variation amount, the problem of failed triggering caused by different sizes of a finger can be avoided, thereby improving the success rate of triggering; meanwhile, an area variation-rate reaches a certain value without going through a changing process from large to small, therefore, it is suitable for a multi-stage control.

In a specific embodiment of the present disclosure, when an area variation-rate is used to trigger a touch-control, a touch-area-judgment-based-triggering mode may be combined to achieve a multi-staged touch-button.

In a specific embodiment of the present disclosure, with a delay-control, the problem of false triggering due to a heavy blow from a user in an emotional state also can be avoided.

DETAILED DESCRIPTION

In the touch-control method, apparatus and the electronic device of the embodiments of the present disclosure, with the use of a parameter associated with an variation of a touch-area to trigger control, the success rate of a touch-control is improved.

Figure 1:
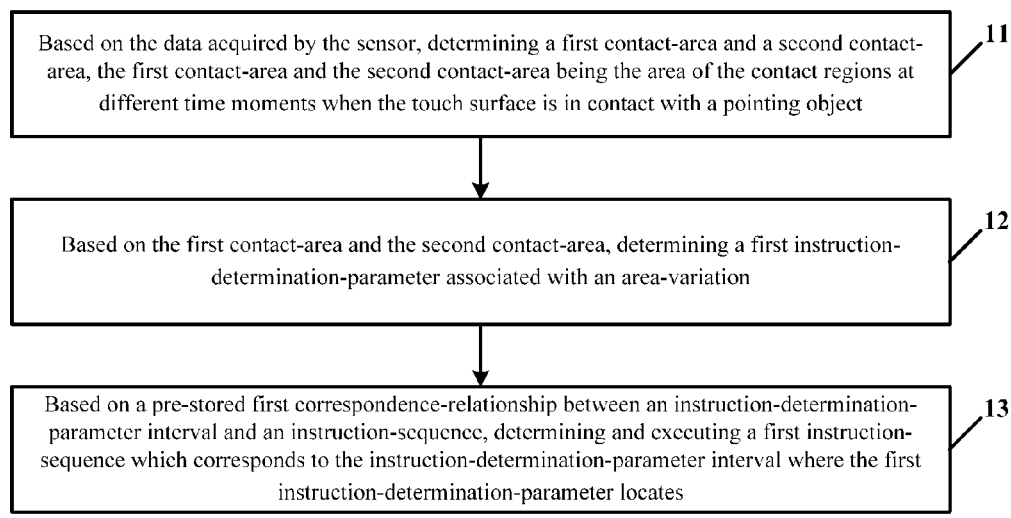
FIG. 1 is a flowchart, illustrating a touch-control method of an embodiment of the present disclosure.

As shown in FIG. 1, the touch-control method of the embodiment of the present disclosure is applied to an electronic device which has a touch surface and a sensor, and the method comprises:

Step 11: based on the data acquired by the sensor, determining a first contact-area and a second contact-area, the first contact-area and the second contact-area being the area of the contact regions at different time moments when the touch surface is in contact with a pointing object;

Step 12: based on the first contact-area and the second contact-area, calculating a first instruction-determination-parameter associated with an area-variation amount;

Step 13: based on a pre-stored first correspondence-relationship between an instruction-determination-parameter interval and an instruction-sequence, determining and executing a first instruction-sequence which corresponds to the instruction-determination-parameter interval where the first instruction-determination-parameter locates.

In a specific embodiment of the present disclosure, a parameter associated with an area-variation amount is used to trigger a touch-control, and by using the parameter associated with an area-variation amount, the problem of failed triggering caused by different sizes of a finger can be avoided, thereby improving the success rate of triggering.

In a specific embodiment of the present disclosure, it is necessary to determine a first instruction-determination-parameter associated with an area-variation amount, based on a first contact-area and a second contact-area; here, the first instruction-determination-parameter may be implemented in several modes, which are explained respectively as below.

<The First Implementation Mode>

The first instruction-determination-parameter is the area-variation amount, and both of them are the same object, i.e., the difference between the second contact-area and the first contact-area; meanwhile, the interval of the instruction-determination-parameter is an area-variation interval.

The implementation in this mode is specifically described as follows.

Assuming that, for a button relevant to shooting, a correspondence-relationship is set as follows: an area-variation amount greater than or equal to an area of 2 units, corresponds to a shooting instruction.

In this case, the triggering of an instruction no longer relies on the absolute value of a contact-area, but is associated with an area-variation amount; therefore, even for a child, a variation of a touch-area can be implemented by pressing firmly with a finger, so as to execute the instruction.

Here, it should be noted that, for a different electronic device, or for a different operating object, the specific quantity of each unit of area may be set as required, which is not designated to a certain value herein, but only for an example.

<The Second Implementation Mode>

In the second implementation mode, it is implemented by using an area variation-rate, wherein, the first contact-area and the second contact-area are the area of the contact regions at a first time moment and a second time moment when the touch surface is in contact with a pointing object, respectively; the first instruction-determination-parameter is a first contact-area variation-rate determined based on the area-variation amount and the time-variation amount, and the instruction-determination-parameter interval is an area variation-rate interval.

Assuming that, for a button relevant to imaging, a correspondence-relationship is set as follows: an area-variation-rate greater than or equal to 2, corresponds to an imaging instruction.

In this case, the triggering of an instruction no longer relies on the absolute value of a contact-area, but is associated with an area-variation-rate (a quotient of an area-variation amount and time); therefore, even for a child, although the absolute value of a contact-area is not large, a variation of the contact-area can be enlarged by reducing the time-length of the occurrence of the area-variation amount, so as to trigger and execute the instruction.

In the first implementation mode, the first instruction-determination-parameter is the area-variation amount, and both of them are the same object; in this case, if a button corresponds to a plurality of functions, then it may result in no trigger, which is explained with an example as below.

Assuming that, for a button relevant to imaging, a correspondence-relationship is set as follows: an area-variation amount less than an area of 10 units corresponds to an imaging instruction, whereas an area-variation amount greater than or equal to an area of 10 units corresponds to a shooting instruction; since the process of an area-variation amount greater than or equal to an area of 10 units definitely needs to go through the process of an area-variation amount less than an area of 10 units, it will result in triggering an imaging instruction and then triggering a shooting instruction during that course, thereby causing false triggering.

In the second implementation mode, it is implemented by using an area variation-rate, thus the above-mentioned false triggering can be avoided, which is explained in detail as below.

Assuming that, for a button relevant to imaging, a correspondence-relationship is set as follows: an area-variation-rate less than 10 corresponds to an imaging instruction, whereas an area-variation-rate greater than or equal to 10 corresponds to a shooting instruction; in this case, a user may control the deformation speed of a pointing object (pressing force) to trigger a corresponding instruction, without causing a phenomenon of false triggering.

If the user needs to trigger an imaging instruction, then a smaller force may be used to press the button, and since the force is smaller, the contact-area-variation-rate in this case is smaller (more time is needed for the occurrence of a same area-variation amount), and thus an imaging instruction is triggered; if the user needs to trigger a shooting instruction, then a larger force may be used to press the button, and since the force is larger, the contact-area-variation-rate in this case is larger (less time is needed for the occurrence of a same area-variation amount), and thus a shooting instruction is triggered; since an area-variation-rate is equivalent to the concept of an acceleration, it will not come out such a situation that a large area-variation-rate needs to go through a small area-variation-rate, and thus it will not bring about false triggering.

In a specific embodiment of the present disclosure, different from the implementation mode in the prior art which uses the absolute value of a contact-area only in relation to one time point, the data used for judgment of triggering is a contact-area-variation amount or a contact-area variation-rate in which both a start point and an end point are involved; in a specific embodiment of the present disclosure, the above-mentioned first time moment may be a time moment when it is detected that a pointing object is in contact with the touch surface, also may be such a time moment that a predefined period of time has elapsed after it is detected that a pointing object is in contact with the touch surface, for example, 0.05 s after it is detected that a pointing object is in contact with the touch surface; certainly, 0.05 s is just given as an example, and the predefined period of time may be set as required.

When the above-mentioned first time moment is such a time moment that a predefined period of time has elapsed after it is detected that a pointing object is in contact with the touch surface, it can avoid false triggering of another situation, which is explained with an example as below.

Sometimes, the button is quickly pressed by a user or other pointing objects unconsciously; in this case, a contact-area variation-rate/contact-area-variation amount is large, reaching a trigger threshold, however, it is just a user's misoperation but not a real need of triggering; if a delay-time is set, because such false triggering goes for a very short time and thereafter arrives to a limit, and the subsequent area-variation amount/contact-area variation-rate can not sustain and thus falls to below the threshold, so triggering will not be caused; if the user wants to trigger, he may firstly press the button with a smaller force, and after a certain period of time applies an increased force, and in such case, the initial force is small, thus the contact-area variation-rate/contact-area-variation amount is not sufficient to trigger the button, whereas the subsequent force is large, thus the contact-area-variation-rate/contact-area-variation amount is large, so a corresponding instruction will be triggered.

Certainly, in a specific embodiment of the present disclosure, considering that an electronic device is used by different users, for example, a tablet pc in a family may be used simultaneously by an adult and a child, while the above-described technical scheme has been able to solve the problem of failed triggering caused by different finger sizes of an adult and a child, the different finger shapes of an adult and a child also will cause a difference in the contact-area-variation rate/contact-area-variation amount, although such difference is far less than the difference of the absolute area; therefore, in a specific embodiment of the present disclosure, the electronic device may have a plurality of correspondence-relationships pre-stored therein, each correspondence-relationship corresponding to a different area-interval; the first correspondence-relationship is, among the plurality of correspondence-relationships, the correspondence-relationship corresponding to the area-interval where the first contact-area locates; among the plurality of correspondence-relationships, there exists at least one instruction-sequence, corresponding to a different contact-area variation-rate.

The above-mentioned situation is explained with an example as below.

Assuming users A (adult) and B (child), and considering the finger shapes of the users A and B, the contact-areas in their touch operations are thus different; in this case, two sets of correspondence-relationships are set as follows:

| | initial area-interval | area variation-rate interval | instruction-sequence 1 |
|---|---|---|---|
| correspondence-relationship 1 | 10-30 | greater than 50 | imaging instruction |
| correspondence-relationship 2 | greater than or equal to 30 | greater than 60 | imaging instruction |

When the child touches, the contact-area may at largest reach 30, whereas the contact-area of an adult's finger with the touch surface is easy in excess of 30; in this case, the correspondence-relationship 2 is set for an adult, while the correspondence-relationship 1 is set for a child; then, based on the interval where the contact-area locates, it can be determined to select the correspondence-relationship 1 or 2, and further, based on the correspondence-relationship between an area variation-rate interval and an instruction-sequence in the correspondence-relationship 1 or 2, the subsequent triggering procedure can be executed, which has been described in detail hereinbefore and here will not discussed any more.

Certainly, in the embodiment of the present disclosure, it is also possible to implement a multi-stage-operation by combining with the absolute value of a contact-area, which is explained as below.

In this implementation mode, in the touch-control method of the embodiment of the present disclosure, before determining and executing the first instruction corresponding to the contact-area variation-rate interval where the first contact-area variation-rate locates, the touch-control method further comprises:

after determining based on the data acquired by the sensor that a pointing object is in contact with the touch surface, executing the second instruction.

After determining based on the data acquired by the sensor that a pointing object is in contact with the touch surface, said step of executing the second instruction specifically comprises:

determining a current contact-area based on the data acquired by the sensor, when it is determined based on the data acquired by the sensor that a pointing object is in contact with the touch surface;

judging whether the current contact-area is greater than a predefined threshold;

executing the second instruction, when the current contact-area is greater than the predefined threshold.

This is explained with an example of photographing as below.

Assuming such a setting that an area variation-rate greater than 50 corresponds to an imaging instruction, when a user presses a finger slightly on a button but maintains a certain pressure, the contact-area in this case will exceed a threshold (which may be set to a small value as required), but the variation rate is very small; so, at this moment, based on the contact-area, an instruction of focal-length adjustment will be determined and executed, but an imaging instruction will not be triggered; when the user feels an appropriate focal length and presses firmly with his finger, now the contact-area variation-rate is greater than 50, and an imaging instruction will be triggered; such implementation mode is suitable for forming a two-stage operation Certainly, in this implementation mode, if accuracy is taken into consideration, then, the time moment for executing the second instruction may be taken as the first time moment, and in turn a contact-area variation-rate is judged with that time moment as a starting point.

Figure 2:
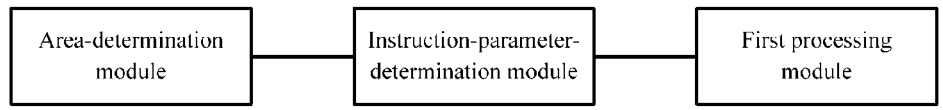
FIG. 2 is a schematic structural diagram, illustrating a touch-control apparatus of an embodiment of the present disclosure.

The touch-control apparatus of the embodiment of the present disclosure, applied to an electronic device which has a touch surface and a sensor, and the touch-control apparatus is shown in FIG. 2, comprising:

an area-determination module, used for: based on the data acquired by the sensor, determining a first contact-area and a second contact-area, the first contact-area and the second contact-area being the area of the contact regions of the touch surface in contact with a pointing object at different time moments;

an instruction-parameter-determination module, used for: based on the first contact-area and the second contact-area, determining a first instruction-determination-parameter associated with an area-variation amount;

a first processing module, used for: based on a pre-stored first correspondence-relationship between an instruction-determination-parameter interval and an instruction-sequence, determining and executing a first instruction-sequence which corresponds to the instruction-determination-parameter interval where the first instruction-determination-parameter locates.

In the above-described touch-control apparatus, the first instruction-determination-parameter is the area-variation amount, and the instruction-determination-parameter interval is an area-variation interval.

In the above-described touch-control apparatus, the first contact-area and the second contact-area are the area of the contact regions at a first time moment and a second time moment when the touch surface is in contact with a pointing object, respectively; the first instruction-determination-parameter is a first contact-area variation-rate determined based on the area-variation amount and the time-variation amount, and the instruction-determination-parameter interval is an area variation-rate interval.

In the above-described touch-control apparatus, the first time moment is such a time moment that a predefined period of time has elapsed after it is detected that a pointing object is in contact with the touch surface.

In the above-described touch-control apparatus, the electronic device has a plurality of correspondence-relationships pre-stored therein, each correspondence-relationship corresponding to a different area-interval; the first correspondence-relationship is, among the plurality of correspondence-relationships, the correspondence-relationship corresponding to the area-interval where the first contact-area locates; among the plurality of correspondence-relationships, there exists at least one instruction-sequence, corresponding to a different contact-area variation-rate.

The above-described touch-control apparatus further comprises:

a second processing module, used for: before the first processing module performs determining and executing the first instruction corresponding to the contact-area variation-rate interval where the first contact-area variation-rate locates, executing the second instruction after determining based on the data acquired by the sensor that a pointing object is in contact with the touch surface.

In the above-described touch-control apparatus, the second processing module specifically comprises:

a unit for determining the current contact-area based on the data acquired by the sensor, when it is determined based on the data acquired by the sensor that a pointing object is in contact with the touch surface;

a unit for judging whether the current contact-area is greater than a predefined threshold;

a unit for executing the second instruction when the current contact-area is greater than the predefined threshold.

The electronic device of the embodiment of the present disclosure has a touch surface, and the electronic device further comprises:

a sensor;

a storage module, for storing a first correspondence-relationship between an instruction-determination-parameter interval and an instruction-sequence;

a processor, which is connected with the sensor and the storage module, and is used for: based on the data acquired by the sensor, determining a first contact-area and a second contact-area, and based on the first contact-area and the second contact-area, determining a first instruction-determination-parameter associated with an area-variation amount, and based on a first correspondence-relationship stored in the storage module, determining and executing a first instruction-sequence which corresponds to the instruction-determination-parameter interval where the first instruction-determination-parameter locates, the first contact-area and the second contact-area being the area of the contact regions of the touch surface in contact with a pointing object at different time moments.

The processor specifically comprises:

an area-determination module, which is connected with the sensor, and is used for: based on the data acquired by the sensor, determining a first contact-area and a second contact-area, the first contact-area and the second contact-area being the area of the contact regions of the touch surface in contact with a pointing object at different time moments;

an instruction-parameter-determination module, which is connected with the area-determination module, and is used for: based on the first contact-area and the second contact-area, determining a first instruction-determination-parameter associated with an area-variation amount;

a first processing module, which is connected with the instruction-parameter-determination module and the storage module, and is used for: based on a pre-stored first correspondence-relationship between an instruction-determination-parameter interval and an instruction-sequence, determining and executing a first instruction-sequence which corresponds to the instruction-determination-parameter interval where the first instruction-determination-parameter locates.

The first instruction-determination-parameter is the area-variation amount, and the instruction-determination-parameter interval is an area-variation interval.

The first contact-area and the second contact-area are the area of the contact regions at a first time moment and a second time moment when the touch surface is in contact with a pointing object, respectively; the first instruction-determination-parameter is a first contact-area variation-rate determined based on the area-variation amount and the time-variation amount, and the instruction-determination-parameter interval is an area variation-rate interval.

The first time moment may be such a time moment that a predefined period of time has elapsed after it is detected that a pointing object is in contact with the touch surface.

The processor is further used for: before the first processing module performs determining and executing the first instruction corresponding to the contact-area variation-rate interval where the first contact-area variation-rate locates, executing the second instruction after determining based on the data acquired by the sensor that a pointing object is in contact with the touch surface.

In the embodiments of the present disclosure, modules may be implemented in software for execution by various types of processors. An identified module of executable code may, for instance, comprise one or more physical or logical blocks of computer instructions which may, for instance, be organized as an object, procedure, or function. Nevertheless, the executable code of an identified module need not be physically located together, but may comprise disparate instructions stored in different locations which, when joined logically together, constitute the module and achieve the stated purpose for the module.

Indeed, a module of executable code may be a single instruction, or many instructions, and may even be distributed over several different code segments, among different programs, and across several memory devices. Similarly, operational data may be identified within modules, and may be embodied in any suitable form and organized within any suitable type of data structure. The operational data may be collected as a single data set, or may be distributed over different locations (including over different storage devices), and may exist, at least partially, merely as electronic signals on a system or network.

When modules can be implemented in software, taking into account the level of existing hardware technology, the modules that can be implemented in software without considering the cost, all can be implemented in corresponding hardware circuits set up by the skilled in the art to achieve corresponding functions. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

The above are only preferred embodiments of the present disclosure, and are not intended to limit the present disclosure; within the spirit and principles of the present disclosure, any modification, equivalent replacement, improvement, and the like, should be encompassed in the scope of the present disclosure.

The invention claimed is:

1. A touch-control method, applied to an electronic device which has a touch surface and a sensor, wherein, the touch-control method comprises:
    determining a first contact-area and a second contact-area based on data acquired by the sensor, the first contact-area and the second contact-area being area of contact regions of the touch surface in contact with a same pointing object at different time moments;
    determining a first instruction-determination-parameter associated with an area-variation amount based on the first contact-area and the second contact-area;
    based on a pre-stored first correspondence-relationship between an instruction-determination-parameter interval and an instruction-sequence, determining and executing a first instruction-sequence which corresponds to the instruction-determination-parameter interval where the first instruction-determination-parameter locates,
    wherein before determining and executing a first instruction corresponding to a contact-area variation-rate interval where the first contact-area variation-rate locates,
        determining a current contact-area based on the data acquired by the sensor, when it is determined based on the data acquired by the sensor that the same pointing object is in contact with the touch surface;
        judging whether the current contact-area is greater than a predefined threshold;
        executing a second instruction-sequence, when the current contact-area is greater than the predefined threshold;
    wherein the first instruction-sequence is different from the second instruction-sequence, the first instruction-sequence and the second instruction-sequence being performed to form a two-stage operation.

2. The touch-control method according to claim 1, wherein, the first instruction-determination-parameter is the area-variation amount, and the instruction-determination-parameter interval is an area-variation interval.

3. The touch-control method according to claim 1, wherein, the first contact-area and the second contact-area are the area of the contact regions at a first time moment and a second time moment when the touch surface is in contact with the same pointing object, respectively; the first instruction-determination-parameter is a first contact-area variation-rate determined based on the area-variation amount and the time-variation amount, and the instruction-determination-parameter interval is an area variation-rate interval.

4. The touch-control method according to claim 3, wherein, the electronic device has a plurality of correspondence-relationships pre-stored therein, each correspondence-relationship corresponding to a different area-interval; the first correspondence-relationship is, among the plurality of correspondence-relationships, the correspondence-relationship corresponding to the area-interval where the first contact-area locates; among the plurality of correspondence-relationships, there exists at least one instruction-sequence, corresponding to a different contact-area variation-rate.

5. The touch-control method according to claim 3, wherein, the first time moment is such a time moment that a predefined period of time has elapsed after it is detected that the same pointing object is in contact with the touch surface.

6. A touch-control apparatus, applied to an electronic device which has a touch surface and a sensor, wherein, the touch-control apparatus comprises:
    an area-determination module, used for determining a first contact-area and a second contact-area based on data acquired by the sensor, the first contact-area and the second contact-area being area of contact regions of the touch surface in contact with a same pointing object at different time moments;
    an instruction-parameter-determination module, used for determining a first instruction-determination-parameter associated with an area-variation amount based on the first contact-area and the second contact-area;
    a first processing module, used for: based on a pre-stored first correspondence-relationship between an instruction-determination-parameter interval and an instruction-sequence, determining and executing a first instruction-sequence which corresponds to the instruction-determination-parameter interval where the first instruction-determination-parameter locates,
    a second processing module, used for: before the first processing module performs determining and executing first instruction corresponding to contact-area variation-rate interval where the first contact-area variation-rate locates, executing the second instruction after determining based on the data acquired by the sensor that the same pointing object is in contact with the touch surface,
    wherein, the second processing module comprises:
    a unit for determining the current contact-area based on the data acquired by the sensor, when it is determined based on the data acquired by the sensor that a pointing object is in contact with the touch surface;
    a unit for judging whether the current contact-area is greater than a predefined threshold; and
    a unit for executing the second instruction when the current contact-area is greater than the predefined threshold, wherein the first instruction-sequence is different from the second instruction-sequence, the first instruction-sequence and the second instruction-sequence being performed to form a two-stage operation.

7. The touch-control apparatus according to claim 6, wherein, the first instruction-determination-parameter is the area-variation amount, and the instruction-determination-parameter interval is an area-variation interval.

8. The touch-control apparatus according to claim 6, wherein, the first contact-area and the second contact-area are the area of the contact regions at a first time moment and a second time moment when the touch surface is in contact with the same pointing object, respectively; the first instruction-determination-parameter is a first contact-area variation-rate determined based on the area-variation amount and the time-variation amount, and the instruction-determination-parameter interval is an area variation-rate interval.

9. The touch-control apparatus according to claim 8, wherein, the electronic device has a plurality of correspondence-relationships pre-stored therein, each correspondence-relationship corresponding to a different area-interval; the first correspondence-relationship is, among the plurality of correspondence-relationships, the correspondence-relationship corresponding to the area-interval where the first contact-area locates; among the plurality of correspondence-relationships, there exists at least one instruction-sequence, corresponding to a different contact-area variation-rate.

10. The touch-control apparatus according to claim 8, wherein, the first time moment is such a time moment that a predefined period of time has elapsed after it is detected that the same pointing object is in contact with the touch surface.

11. An electronic device having a touch surface comprising:
a sensor;
a storage module, for storing a first correspondence-relationship between an instruction-determination-parameter interval and an instruction-sequence;
a processor, which is connected with the sensor and the storage module, and is used for determining a first contact-area and a second contact-area based on data acquired by the sensor, determining a first instruction-determination-parameter associated with an area-variation amount based on the first contact-area and the second contact-area, and based on a first correspondence-relationship stored in the storage module, determining and executing a first instruction-sequence which corresponds to the instruction-determination-parameter interval where the first instruction-determination-parameter locates, the first contact-area and the second contact-area being area of contact regions of the touch surface in contact with a same pointing object at different time moments,
wherein the processor is further used for: before determining and executing a first instruction corresponding to a contact-area variation-rate interval where the first contact-area variation-rate locates, determining a current contact-area based on the data acquired by the sensor, when it is determined based on the data acquired by the sensor that the same pointing object is in contact with the touch surface;
judging whether the current contact-area is greater than a predefined threshold;
executing a second instruction-sequence, when the current contact-area is greater than the predefined threshold, wherein the first instruction-sequence is different from the second instruction-sequence, the first instruction-sequence and the second instruction-sequence being performed to form a two-stage operation.

12. The electronic device according to claim 11, wherein, the processor comprises:
an area-determination module, which is connected with the sensor, and is used for determining a first contact-area and a second contact-area based on the data acquired by the sensor, the first contact-area and the second contact-area being the area of the contact regions of the touch surface in contact with the same pointing object at different time moments;
an instruction-parameter-determination module, which is connected with the area-determination module, and is used for determining a first instruction-determination-parameter associated with an area-variation amount based on the first contact-area and the second contact-area;
a first processing module, which is connected with the instruction-parameter-determination module and the storage module, and is used for:
based on a pre-stored first correspondence-relationship between an instruction-determination-parameter interval and an instruction-sequence, determining and executing a first instruction-sequence which corresponds to the instruction-determination-parameter interval where the first instruction-determination-parameter locates.

13. The electronic device according to claim 11, wherein, the first instruction-determination-parameter is the area-variation amount, and the instruction-determination-parameter interval is an area-variation interval.

14. The electronic device according to claim 11, wherein, the first contact-area and the second contact-area are the area of the contact regions at a first time moment and a second time moment when the touch surface is in contact with the same pointing object, respectively; the first instruction-determination-parameter is a first contact-area variation-rate determined based on the area-variation amount and the time-variation amount, and the instruction-determination-parameter interval is an area variation-rate interval.

15. The electronic device according to claim 14, wherein, the first time moment is such a time moment that a predefined period of time has elapsed after it is detected that the same pointing object is in contact with the touch surface.

\* \* \* \* \*